United States Patent [19]

Fox

[11] 4,213,579

[45] Jul. 22, 1980

[54] FISHING REEL

[76] Inventor: Kenneth H. S. Fox, 6 Wardour Lodge, Sunningdale, Berkshire, England

[21] Appl. No.: 10,023

[22] Filed: Feb. 7, 1979

[30] Foreign Application Priority Data

May 24, 1978 [GB] United Kingdom ............... 21933/78

[51] Int. Cl.³ ...................... A01K 89/01; A01K 89/02
[52] U.S. Cl. .............. 242/84.2 B; 242/215; 254/348; 254/357
[58] Field of Search ..................... 242/84.2 B, 84.1 R, 242/213, 215; 254/186 HC

[56] References Cited

U.S. PATENT DOCUMENTS

| | | | |
|---|---|---|---|
| 1,101,473 | 6/1914 | Schwinnen | 254/186 HC |
| 2,550,271 | 4/1951 | Kagel, Sr. | 242/84.2 B |
| 2,614,767 | 10/1952 | Dean | 242/84.2 B |
| 3,215,360 | 11/1965 | Chambers | 242/215 |
| 3,727,857 | 4/1973 | Chann | 242/215 |

FOREIGN PATENT DOCUMENTS

| | | | |
|---|---|---|---|
| 1324325 | 3/1963 | France | 242/84.2 B |
| 416059 | 9/1934 | United Kingdom | 242/215 |

*Primary Examiner*—Billy S. Taylor
*Attorney, Agent, or Firm*—Dunlap, Codding & McCarthy

[57] ABSTRACT

A fishing reel is disclosed wherein the spool thereof is rotatably and longitudinally slidable on a shaft rotatable via the handle used to rewind the reel. The spool is hollow and engages the shaft via a portion having radial teeth formed on both sides thereof and positioned between a driver fixed on the shaft and a gear rotatably mounted on the shaft and coupled thereto via a gear train such that the gear rotates about the axis of the shaft at a rate differing from the rotation rate of the shaft. A push rod connected to the handle extends through the shaft and is rotatably connected to the spool for longitudinally positioning the spool on the shaft so as to engage the toothed portion thereof with teeth on the driver or with teeth on the gear to provide the reel with a multi-speed capability. The reel is pivotally mounted on a fishing rod via an extension pivotally connected to a bracket supporting the body of the reel so that the axis of the shaft can be aligned in a parallel relation with the rod for casting or in a transverse relation for rewinding. A latch on the bracket engages slots in the extension to fix the position of the reel with respect to the rod and the slot engaged by the latch in the casting position of the rod is deeper than other slots so that the latch undergoes a greater pivotation when the reel is positioned for casting than when the reel is positioned for rewinding. A brake pad on the latch is positioned to engage the spool when the pivotation of the latch corresponds to engagement of the latch with the deeper slot so that the spool does not rotate during casting.

5 Claims, 3 Drawing Figures

FISHING REEL

BACKGROUND OF THE INVENTION

1. Field of the Invention

The present invention relates generally to fishing reels and more particularly, but not by way of limitation, to multispeed fishing reels.

2. Background of the Invention

The advantages of providing a fishing reel with more than one drive speed are well known in the art and a number of multispeed drive fishing reels are known. Examples of patents disclosing such reels are: U.S. Pat. Nos. 3,727,857, issued Apr. 17, 1973 to Chann; 3,669,378, issued June 13, 1972 to Miyamae; 3,325,117, issued June 13, 1967 to Hiromitsu; 3,215,360, issued Nov. 2, 1965 to Chambers; and British Patent No. 416,059 to Farlow, complete accepted Sept. 7, 1934.

It is also known to mount a reel on a rod such that the axis of the spool of the reel can be positioned in a parallel relation with the rod for casting and in a transverse relation for rewinding. U.S. Pat. Nos. disclosing such mounting include: 2,614,767, issued Oct. 21, 1952 to Dean; 2,581,306, issued Jan. 1, 1952 to Slotterback; Italian Patent No. 406,123; French Patent No. 649,232; and British Patent No. 211,406.

SUMMARY OF THE INVENTION

A problem with multi-speed reels heretofore known is that such reels tend to be mechanically complex. It will be clear that this complexity is disadvantageous in that it increases the expense of manufacturing the reel and affords numerous possibilities for malfunctioning of the reel. This problem has been solved in the present invention by means of an inexpensive clutch mechanism built in to a slidable spool for a reel. In particular, the spool is slidably mounted on a drive shaft which is turned via an operating knob by the user of the reel and rotation is imparted to the spool via a driver fixed to the drive shaft or via a gear, loosely mounted on the drive shaft, coupled to the drive shaft via a gear train. A push rod disposed within the drive shaft is rotatably connected to the spool to move the spool against the driver or against the gear. Teeth on a portion of the spool engage the driver or the gear to transmit the rotation of the drive shaft to the spool, said transmission being direct to result in a rotation rate of the spool equal to the rotation rate of the drive shaft when the spool engages the driver and said transmission being indirect to rotate the spool at a rate differing from that of the drive shaft when the spool engages the gear.

The reel is mounted on a rod via an extension having slots in one end pivotally connected to a bracket fixed to the housing of the reel. A spring loaded latch pivoted on the bracket engages the slots for selected positions of the reel so that the reel can be fixed with the axis of the spool parallel to the rod for casting and transverse thereto for rewinding. A feature provided by mounting the latch on the bracket is that the slot engaged by the latch for the casting mode of the reel can be deepened to permit a greater degree of pivotation of the latch in the casting mode than in a rewinding mode so that a brake pad can be positioned on the latch to engage the spool in the casting mode to prevent rotation of the spool during casting.

An object of the present invention is to provide a multi-speed fishing reel.

Another object of the invention is to provide a multi-speed reel which is inexpensive to manufacture.

Yet a further object of the invention is to provide a multi-speed fishing reel affording little possibility of malfunction.

Other objects and advantages of the invention will be evident from the following detailed description when read in conjunction with the accompanying drawings which illustrate an embodiment of the invention, and when read in conjunction with the appended claims.

DESCRIPTION OF THE PREFERRED EMBODIMENT

Figure 1:
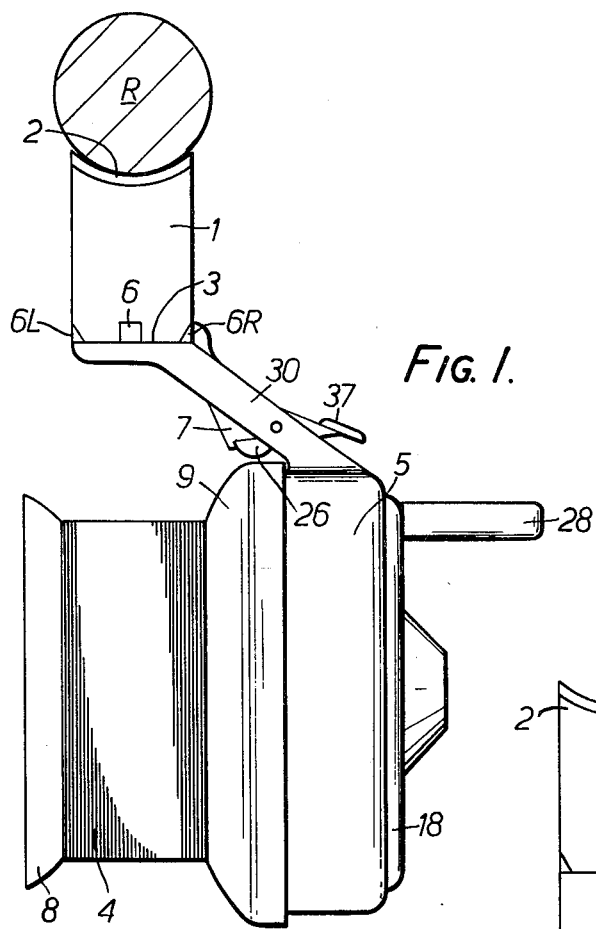
FIG. 1 is a rear elevational view of the reel of the present invention showing one orientation of the reel with respect to the fishing rod.

Referring to the drawings, FIG. 1 shows a fishing reel comprising an extension 1, a mounting shoe 2 adapted to be attached to a rod R by conventional means, a spool 4, a driving plate 18 fitted with a knob 28 and a housing 5.

The housing 5 is connected to the extension or stalk 1 through a bracket 30 which is rigidly attached to the housing and pivotally attached to the extension thus permitting the housing 5, driving plate 18 and spool 4 to be swivelled on the bracket 30 in relation to the extension 1. The extension 1 is provided with slots 6, 6L and 6R and the bracket 30 is provided with a pawl or latch 7 which is spring loaded so that its upper end is biased towards the extension to locate itself in engagement with any one of the slots 6, 6L or 6R. In FIG. 1 the latch 7 is located with its upper end in slot 6R thus locating and holding the assembly in the position shown with respect to the extension 1, and of course the rod R.

Figure 2:
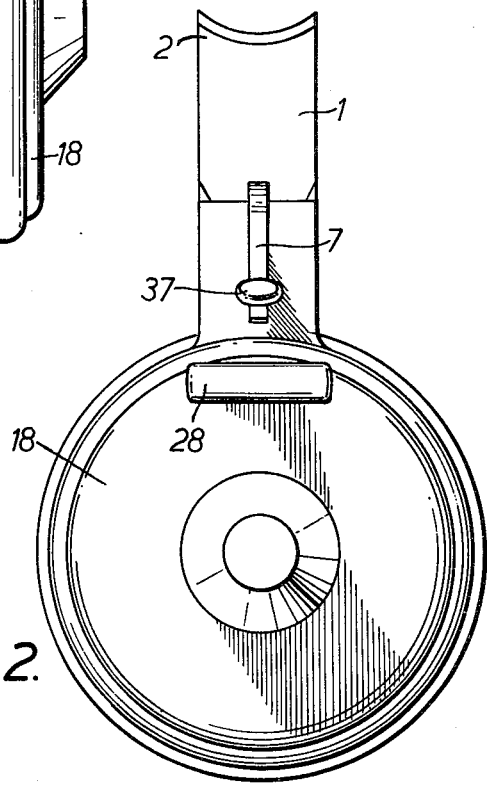
FIG. 2 is a rear elevation similar to FIG. 1 showing a second position of the reel on the rod.

The latch 7 is provided with a finger plate 37 so that the user of the reel can move the latch 7 against its spring bias to release the upper end of the latch 7 from the slot 6R. With the latch 7 so released the assembly may pivot at 3 with respect to the extension 1 until the latch 7 is in a position to locate its upper end within one of the other slots 6 or 6L. Once in such a position the finger pressure on the finger plate 37 is released permitting location of the assembly in that position. With the latch 7 located into slot 6 the reel will take the form shown in FIG. 2 and with the latch 7 located in slot 6L the reel will take the form illustrated in FIG. 3.

The latch 7 further comprises a brake pad 26 of neoprene or other suitable material. The slot 6 extends deeper into the extension 1 than does either of the slots 6L or 6R and when the latch 7 is located with its upper end in slot 6 the further movement of the latch 7 in the direction of its spring biasing which is thereby allowed brings the pad 26 into contact with a circumferential surface of the spool 4 thus preventing rotation of the spool about its axis. The depth of the slots 6L and 6R are such that the pad 26 is kept clear of such engagement when the latch 7 is located in one of them.

The outer flange 8 of the spool 4 is curved for reasons which will become apparent and the inner flange 9 is extended over the housing 5 to allow direct hand control of the rotation of the spool 4 by the user, for example, to brake the spool 4.

Figure 3:
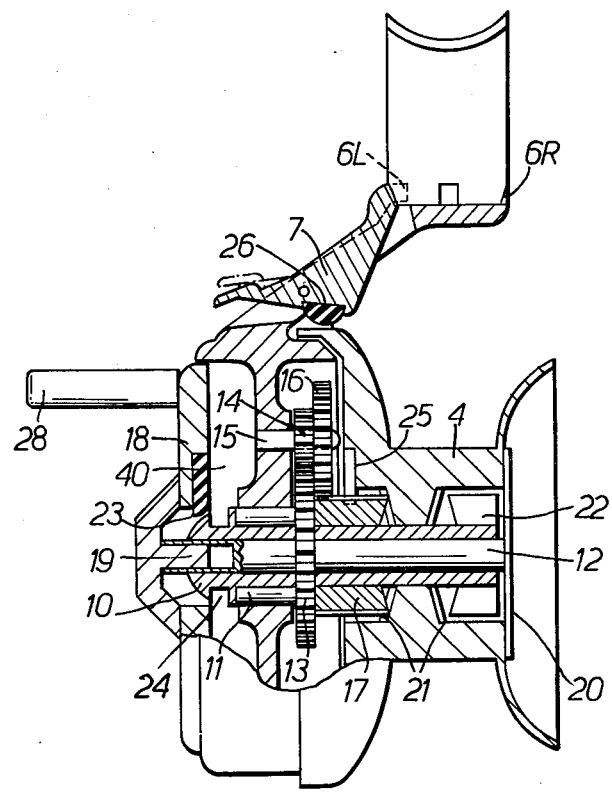
FIG. 3 is a rear elevation in partial cutaway and partial cross-section similar to FIGS. 1 and 2 and showing a third position of the reel on the rod.

In use by a fisherman it is intended that the spool be used in the positions shown in FIGS. 1 and 3; that is, with the axis of the spool 4 being at right angles to the principal axis of the rod R, for winding in fishing line onto the spool. The position shown in FIG. 1 is intended for right handed winding whereas the position shown in FIG. 3 is intended for left handed winding. When the fisherman wishes to cast line from the spool, the assembly is rotated to the position shown in FIG. 2; that is, with the axis of rotation of the spool 4 being substantially parallel to the principal axis of the rod R. In this position the line can be pulled from the spool 4 over the curved outer flange 8 without rotation of the spool 4. In this position the spool 4 is in fact locked by engagement of the pad 26 with the said circumferential surface of the spool 4. The curvature of the outer flange 8 previously referred to allows the line to run freely over the edge of the spool 4. It is of course possible to cast from the reel with the spool 4 in either of the positions shown in FIGS. 1 and 3 if the fisherman feels any advantage there can be so obtained. In this case the braking effect of the fishermans hand, for example finger, on the extended flange 9 of the housing may come into play.

Referring now to the internal construction of the reel as shown at FIG. 3 the spool 4 is mounted to rotate freely about a shaft 10 which in turn is located in a bearing 11 in the housing 5 within which it may rotate. A push rod 12 is located concentrically within the shaft 10 and is constrained to rotate with the shaft 10 by means of a "spade" or spline arrangement 19. The spade or spline arrangement 19 allows the push rod 12 to slide axially within the shaft 10. One end of the push rod 12 is rigidly fixed to the driving plate 18 so that rotation of the driving plate 18 by means of the knob 28 will cause rotation of the push rod 12 and the shaft 10. The other end of the push rod 12 is connected through a rotatable bearing (not shown), of any suitable construction, to cover plate 20 which plate is rigidly attached to the spool 4 around its periphery. Thus rotation of the driving plate 18 and consequent rotation the push rod 12 can take place without rotation of the spool 4 about its axis of rotation owing to the presence of the said rotatable bearing.

As indicated the rod 12 is slidable within the shaft 10 and this can be brought about by pressure being applied to the driving plate 18 towards the housing; that is, to the right of FIG. 3. This sliding movement will cause the driving plate 18 to take up a position within a recess 40 in the housing 5. The spool 4 will also move to the right as shown in FIG. 4 by a corresponding distance. A result of the driving plate 18 moving will be to locate a spring catch 23 in an annular groove 24 disposed around the periphery of the end of the shaft 10, thus holding the driving plate 18 and spool in the position to which it has been moved by pressure being applied to the driving plate 18. The spring catch 23 is such that reverse pressure on the spool 40 will allow the assembly to revert to the configuration as shown in FIG. 3 and the assembly will be located in that position by engagement of the spring catch 23 with the end of the shaft 10 as shown.

The driving plate 18, the push rod 12 and the spool 4 are thus axially movable in relation to the drive shaft 10 and the housing 5.

A gear wheel 13 is fixed to the shaft 10 and engages an intermediate gear 14 on a lay shaft 15, the lay shaft 15 being located in the housing 5. A further intermediate gear 16 is also fixed on the lay shaft and engages a further gear 17 which can rotate around the shaft 10.

The interior of the spool 4 has radial dog clutch teeth 21, these teeth being engaged in the position shown with corresponding teeth cut on the face of the gear 17. Thus in position shown in FIG. 3 the rotation of the driving plate 18 will result in rotation of the push rod 12, the shaft 10, the gear wheel 13 the gears 14 and 16 on the lay shaft 15, the gear 17 and thereby the spool 4 by the engagement of the dog clutch teeth 21 and the corresponding teeth on the gear 17. This therefore provides a geared mode of drive of the spool 4.

When pressure is applied to the driving plate 18 to push it into the recess 40 the dog clutch teeth 21 of the spool 4 will disengage from the corresponding teeth cut in the face of the gear 17 and engage with corresponding teeth cut in a driver 22 fixed to the end of the main shaft 10. Thus rotation of the driving plate 18 will cause rotation of the push rod 12, the shaft 10, the driver 22 and thereby the spool 4, this constituting the direct mode of operation of the reel. In this mode of operation the gears 13, 14, 16 and 17 will clearly continue to rotate but they will have no effect on the rotation of the spool 4 other than as indicated below.

Thus linear movement of the driving plate 18 causes the selection of either the direct or geared mode of operation of the reel, in the former of which the spool 4 will rotate at the same speed as the driving plate 18, and in the latter of which the spool 4 will rotate at an increased speed proportional to the speed of rotation of the driving plate 18, accordingly to the gear ratio chosen.

A sprung pawl 25 is also mounted on the spool 4 to provide drag, the pawl 25 acting as a ratchet on the teeth of the gear 17. When the geared mode of operation is being used no drag is present as both the spool 4 and the gear 17 both rotate at the same speed. However when the direct mode of operation is being used, the spool 4 and gear 17 speeds differ according to the gear ratio chosen and thus drag is provided.

It is clear that the present invention is well adapted to carry out the objects and obtain the ends and advantages mentioned as well as those inherent therein. While a presently preferred embodiment of the invention has been disclosed for purposes of this disclosure, numerous changes may be made which will readily suggest themselves to those skilled in the art and which are encompassed within the spirit of the invention disclosed and is defined in the appended claims.

What is claimed is:

1. A two-speed reel for a fishing rod, comprising:
   a housing;
   means for mounting the housing on the rod;
   a shaft rotatably supported by the housing;
   means for rotating the shaft;
   a driver mounted on the shaft for rotation therewith, the driver having radial teeth formed on one side thereof;
   a gear rotatably mounted on the shaft and having radial teeth formed on one side thereof facing the radial teeth of the driver and spaced a distance therefrom;
   gear means coupling the gear to the shaft for rotating the gear at a rate differing from the rotation rate of the shaft in response to a rotation of the shaft;
   a spool slidably mounted on the shaft and extending about the radial teeth formed on the driver and the radial teeth formed on the gear, the spool having a portion disposed between the driver and the gear and said portion having radial teeth on one side thereof for engaging the radial teeth of the driver in one axial position of the spool and having radial teeth on an opposite side thereof for engaging the radial teeth of the gear in another axial position thereof; and means for axially positioning the spool in the shaft.

2. The reel of claim 1 wherein the means for mounting the housing on the rod comprises:

a shoe attachable to the rod;

an extension connected at one end to the shoe and extending therefrom so as to extend transversely from the rod in a mounted condition of the reel on the rod;

a bracket rigidly attached to the housing and extending therefrom to the end of the extension opposite the shoe, the bracket pivotally attached to the extension for pivotation thereon about an axis transverse to the rod in the mounted condition of the reel; and a latch pivotally mounted on the bracket, a portion of the latch extending from the pivotal attachment thereof to the bracket and terminating in an end adjacent the extension;

wherein the latch is characterized as being spring loaded for urging said one end thereof adjacent the extension toward the extension; and wherein a plurality of slots are formed in the extension to receive said end of the latch adjacent thereto, whereby entry of said one end of the latch into one of the slots positions the housing about the transverse rotation axis of the bracket.

3. The reel of claim 2 wherein a flange is formed on the spool adjacent the bracket; wherein a brake pad is mounted on the latch for pivotation therewith, said brake pad positioned on the latch for pivotation toward the flange on the spool in response to a pivotation of the end of the latch adjacent the extension toward the extension; and wherein a selected slot formed on the extension is dimensioned to receive said end of the latch to a depth sufficient to permit engagement between the brake pad and the flange on the spool.

4. The reel of claim 1 wherein the shaft is characterized as having a tubular form; and wherein the means for axially positioning the spool on the shaft comprises a push rod slidably mounted within the shaft and extending therethrough, one end of the push rod rotatably connected to one end of the spool for positioning the spool on the shaft via longitudinal positioning of the push rod within the shaft and the opposite end of the push rod connected to the means for rotating the shaft, whereby the push rod is positionable in the shaft via positioning of the means for rotating the shaft.

5. The reel of claim 4 wherein the means for rotating the shaft comprises:

a driving plate connected to the push rod and having a portion slidably engaging the shaft for turning the shaft in response to a rotation of the driving plate; and a knob offset from the push rod for manually rotating the driving plate.

* * * * *